Patented July 9, 1940

2,207,680

UNITED STATES PATENT OFFICE 2,207,680

ASCORBIC ACIDS AND METHODS OF MAKING SAME

Burckhardt Helferich, Leipzig, Germany, assignor to Winthrop Chemical Company, Inc., New York, N. Y., a corporation of New York No Drawing. Application May 12, 1939, Serial No. 273,293. In Germany May 23, 1938

7 Claims. (Cl. 260—344)

The present invention relates to ascorbic acids and to methods of making same.

The ascorbic acids have the following typical configuration:

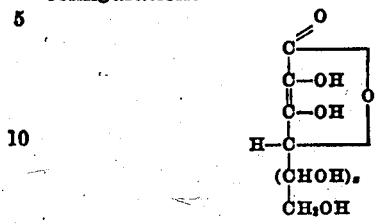

wherein x may stand for 0 or a low whole number. In this formula the special arrangement of the H-atoms and OH-groups in relation to the axis of the C-atoms has not been taken into account. These compounds have throughout a strong reducing action. Besides, a great number of them possess a surprising therapeutical and physiological efficacy. The best known of them is the levo-ascorbic acid, known as vitamin C, of the following formula:

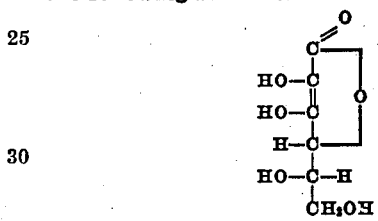

In U. S. Patent No. 2,068,453 a method for preparing ascorbic acids is described which substantially comprises causing a glyoxylic acid ester to act upon an aldo-sugar in an alkaline medium.

Now I have found a further method for preparing ascorbic acids. The new process is based on the observation that the atomic grouping

characteristic of the said acids is also formed by causing a mesoxalic acid ester to act upon an aldo-sugar in the presence of an alkaline agent, for instance in an aqueous or alcoholic solution. For producing the alkaline reaction sodium hydroxide, alkali metal cyanides, potassium carbonate, sodium alcoholate or organic bases, such as piperidine, are suitable. It is advisable to carry out the reaction with exclusion of air in an inert gas, for instance in a nitrogen atmosphere, and to heat the solution of the reaction components to boiling. Instead of the free aldo-sugars there may likewise be used the derivatives of these compounds which are transformed into aldo-sugars by the action of an alkaline agent. Suitable compounds of this kind are, for instance, the acyl derivatives of the aldo-sugars, such as tetracetyl arabinose, pentacetyl glucose and the like, furthermore for instance the acetylized aldonic acid nitriles (G. Zemplen & Kiss, Berichte der Deutschen Chemischen Gesellschaft 60 (1927) 165), such as the tetracetyl-levo-xylonic acid nitrile.

The course of the reaction is illustrated by the following reaction scheme:

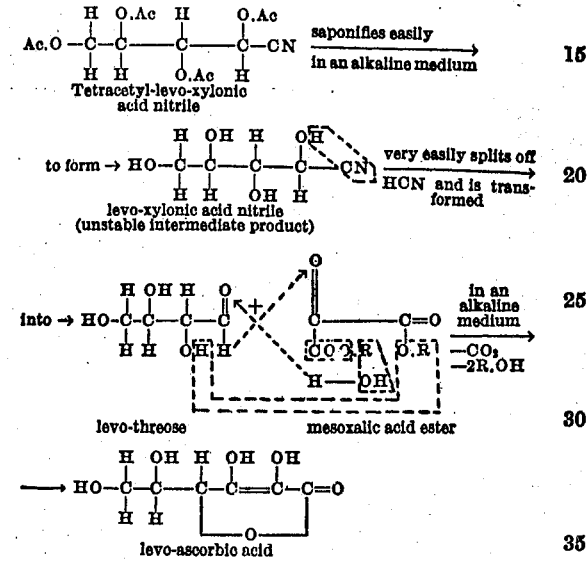

The following examples serve to illustrate the invention, but they are not intended to limit it thereto; the parts are by weight unless otherwise stated:

1. Levo-gluco-ascorbic acid 1 mol of levo-arabinose is boiled for 10 minutes in a reflux apparatus together with a solution of 2 mols of mesoxalic acid ester in about 10 parts of methanol after 3 mols of sodium cyanide have been added. When acidified with alcoholic hydrochloric acid 28 per cent of the theoretic quantity of levo-gluco-ascorbic acid may be determined by titration with an iodine solution. By a known method, for instance by precipitation with lead acetate, the content of ascorbic acid may be enriched and, if desired, the acid may be obtained in pure condition. All operations should, as far as possible, be carried out with exclusion of oxygen.

2. Levo-ascorbic acid 7.9 parts of tetracetyl-levo-xylonic acid nitrile (Berichte der Deutschen Chemischen Gesellschaft, 60 (1927) 165) and 8.7 parts of mesoxalic acid ethyl ester are dissolved, while gently heating, in 50 parts by volume of absolute methanol, the clear solution is cooled to +10° C. and mixed at room temperature in a nitrogen atmosphere with 75 parts by volume of a N/1 sodium methylate solution. The mixture is heated thereby to about 25° C. The solution assumes a feebly yellow coloration and after some minutes a precipitate begins to separate. After a storing of 12 hours at room temperature 50 parts by volume of a 4N-solution of hydrochloric acid in alcohol are added. 46 per cent of the theoretic quantity of levo-ascorbic acid may be determined by titration with an iodine solution.

The product is isolated in known manner, for instance by evaporation, extraction with alcohol of the residue which, as far as possible, is freed from hydrochloric acid and sodium chloride, precipitation with lead acetate and decomposition of the lead salt with hydrogen sulfide. After recrystallization the substance thus obtained melts at 185° C. to 189° C. with decomposition. The rotation in water is $$(\alpha)_D^{20} = +22°$$

and in methanol $$(\alpha)_D^{20} = +45°$$

I claim:

1. The process of preparing ascorbic acids which comprises reacting a mesoxalic acid ester with glucose in the presence of an alkaline agent.

2. The process of preparing ascorbic acids which comprises reacting a mesoxalic acid ester with arabinose in the presence of an alkaline agent.

3. The process of preparing ascorbic acids which comprises reacting a mesoxalic acid ester with tetracetyl-levo-xylonic acid nitrile in an alcoholic solution of alkaline reaction.

4. The process of preparing ascorbic acids which comprises reacting a mesoxalic acid ester with tetracetyl-levo-xylonic acid nitrile in a solution of sodium alcoholate.

5. The process of preparing ascorbic acids which comprises reacting a mesoxalic acid ester with tetracetyl-levo-xylonic acid nitrile in a solution of sodium methylate.

6. The process of preparing ascorbic acids which comprises reacting in the presence of an alkaline agent a mesoxalic acid ester with a member of the group consisting of aldo-sugars and the derivatives thereof which are transformed into aldo-sugars by the action of an alkaline agent.

7. The process of preparing ascorbic acids which comprises reacting in the presence of an alkali metal cyanide a mesoxalic acid ester with a member of the group consisting of aldo-sugars and the derivatives thereof which are transformed into aldo-sugars by the action of an alkaline agent.

BURCKHARDT HELFERICH.